United States Patent [19]

Ramseier

[11] 4,321,865
[45] Mar. 30, 1982

[54] APPARATUS FOR TREATING NUTS OR THE LIKE

[75] Inventor: Roland Ramseier, Dällikon, Switzerland

[73] Assignee: Widmer & Ernst AG, Wettingen, Switzerland

[21] Appl. No.: 137,252

[22] Filed: Apr. 4, 1980

Related U.S. Application Data

[63] Continuation-in-part of Ser. No. 881,962, Feb. 27, 1978, abandoned.

[30] Foreign Application Priority Data

Feb. 27, 1980 [CH] Switzerland .......................... 1557/80

[51] Int. Cl.$^3$ ............................................. A23N 5/00
[52] U.S. Cl. ........................................ 99/576; 83/864; 83/873; 83/885; 99/579; 99/589; 99/591
[58] Field of Search .................. 99/540, 567, 574–576, 99/579, 589, 591, 593; 83/884, 885, 864, 873; 198/461, 624–628, 391, 380

[56] References Cited

U.S. PATENT DOCUMENTS 2,344,711  3/1944  McNutt et al. ....................... 99/576
3,143,201  8/1964  Wyle et al. .......................... 198/380
3,147,841  9/1964  Austin ................................. 198/391

FOREIGN PATENT DOCUMENTS 1050852  12/1966  United Kingdom .................. 99/576
1237478  6/1971  United Kingdom .................. 99/576

Primary Examiner—Philip R. Coe
Assistant Examiner—Timothy F. Simone
Attorney, Agent, or Firm—Bachman and LaPointe

[57] ABSTRACT

In treating nuts which are supplied by way of transport means and which are held between two conveyor belts, a groove of uniform depth is milled into the shell of the nut by means of overlapping milling discs, which groove permits the shell of the nut to be broken open by a subsequent splitting means.

On the transport means, the nuts are separated and aligned by vibration and the configuration of the guide tracks. A spiral conveyor with a baffle is also provided for this purpose.

The conveyor belts are adapted to the different thicknesses of the nuts by means of vertically adjustable rollers.

The depth of the groove which is less than the thickness of the shell of the nut is restricted by toothed rings on the milling discs and annular shoulders which are arranged at a displaced position relative thereto radially with respect to the axis of rotation. The milling discs themselves are arranged on pivotal arms or plunger members, wherein the axes of rotation thereof are held by energy storage means at a spacing from each other which is less than double the radius of the two milling discs.

The splitting means comprises movable knives with knife blades which increase in thickness and over which the nuts are pushed, being guided in the grooves.

24 Claims, 10 Drawing Figures

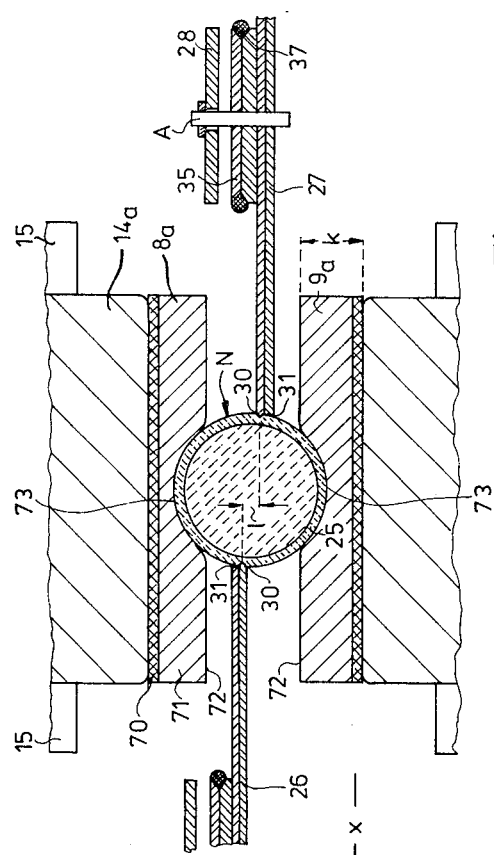
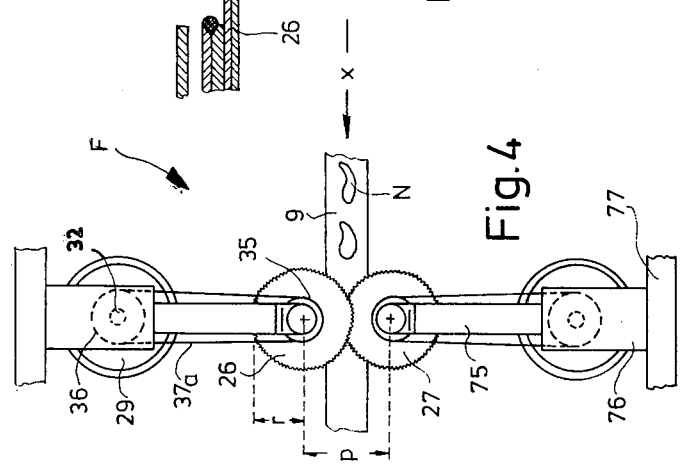
Fig.6
Fig.4

APPARATUS FOR TREATING NUTS OR THE LIKE

CROSS REFERENCE TO RELATED APPLICATION

This application is a continuation-in-part application of U.S. patent application Ser. No. 881,962, filed Feb. 27, 1978, now abandoned.

BACKGROUND OF THE INVENTION

The present invention concerns a process for treating kernels with a shell-like wall, in particular nuts such as for example cashew nuts, macadamia nuts, coconuts or the like, which are supplied by way of transport means and which are held between two conveyor belts, wherein at least one groove is milled into the shell-like wall or the shell of the nut by a milling means in the form of milling discs which are arranged rotatably about an axis of rotation and which engage into the space between the conveyor belts, which groove facilitates breaking open the shell of the nut by a breaking means or splitting means, and apparatus for carrying out the process.

As nuts have been known as foodstuff since the earliest times, many different ways of opening nuts have been sought. Difficulties arise in this respect inter alia by virtue of the different configurations of the nut shells.

Cashew nuts comprise for example very hard thick-walled shells which contain kidney-shaped irregular kernels which are each formed from two halves which cling lightly together, similarly to peanuts or groundnuts. These kernels have a high market value, and undamaged whole kernels produce approximately twice the clear return of broken kernels.

In order to obtain the kernels, the tough cashew shell which is also kidney-shaped, like the configuration of the kernels, must be broken. This is still predominantly a manual operation, after special preliminary treatment, but attempts have been made to provide for opening of the shells by mechanical means such as for example by cutting the shells open, although with little success, that is to say, resulting in a small proportion of whole kernels.

For the purposes of opening walnuts, use is made for example of a milling device which has two milling discs which are mounted on movable pivotal arms and between which the walnuts are guided in a loose arrangement by means of conveyor belts. The conveyor belts carry chamber-like subdivisions in which the nuts are disposed. As however the absence of damage to the kernels is not an important point in regard to walnuts, the milling discs engage to any depth into the nut.

This apparatus cannot be used for opening for example cashew nuts, as it is precisely the absence of damage to the kernels which is the most important factor.

The operation of breaking open the shells is also effected in a so-called palm-nut breaker in which the nuts are flung against the wall. In this case also the amount of broken nuts is very high.

A manual operation of breaking open the nuts results in a high level of cost and a large work force. In addition the oil which is present for example in the cashew nut shell endangers the health of the workers.

Further difficulties occur when transporting the nuts to the opening means.

Hitherto, the transport means used were simple transport belts which, although suitable for the manual operation of opening the nuts, do not take any account whatever of the possibility of automation, as the nuts are of widely differing shapes.

However, it is precisely automation of transportation and breaking open of the nuts which appears to be urgently necessary as the nuts are ever increasing in value as foodstuffs and in future are also to be grown on an enlarged scale in plantations.

The problem of the present invention is to develop an apparatus for processing nuts, which, in spite of the most extensive automation, leaves the kernels undamaged in the operation of opening the nuts and which nonetheless operates economically. In addition, the apparatus should be easy to operate and to maintain, as the intention is for the apparatus to be used as close as possible to the area in which the nuts are grown, that is to say, for example, in regions which are of poor development from the infrastructure point of view.

SUMMARY OF THE INVENTION

The above-noted problem is solved in that the nuts are automatically separated and aligned by way of transport means and placed between the two conveyor belts and fed to the milling discs, and the milling discs provide the nut shells with at least one groove which is of uniform depth but whose depth is less than or equal to the thickness of the shell.

An essential prerequisite for automation of the operation of breaking open nuts is the separation and alignment of the nuts. This is intended to compensate for the variations in sizes and shapes of the nuts, for the major part.

Advantageously therefore, conveyance of the nuts is effected on shaker conveyors, vibration tracks or by vibration containers, which are disposed upstream of the conveyor belts, wherein the transport speed is controlled by the strength of vibration. In this arrangement, the nuts are separated from each other, for example by a particular configuration of the transfer station or by a transfer orifice from the vibration container to a vibration channel which permits only one nut to pass, and/or by varying control of the speed of rotation of the conveyor belts or an upper run and a lower run, and the transportation speed which is controlled by the vibration effect. In this way, the nuts are automatically separated out.

For the sake of simplicity, alignment of the nuts is effected by the shape of the conveyor tracks themselves, it being preferred for the longitudinal axis of the nut to be aligned substantially parallel to the direction of conveyance, because of the subsequent milling operation. In many cases, it is sufficient in this respect for the vibration channel to be of a u-shaped to v-shaped cross-section.

However, the present invention also includes a process wherein the nuts are so aligned by means of baffle arrangements that in almost every case they are introduced between the conveyor belts with the thick end first. The thick part of the nut generally also has the stalk attachment and is particularly thick-walled and hard.

In this arrangement, the transport means which is disposed upstream of the conveyor belts advantageously comprises a spiral conveyor in which the nuts are supplied by vibration on conveyor tracks to two baffle means which are arranged in succession at an inclined angle with respect to the direction of conveyance. As a result of the centrifugal force which obtains in a vibrating spiral conveyor, the nuts move upwards against the wall of the spiral conveyor on the guide tracks. The first baffle means deflects the nuts away from the wall of the conveyor to the outer edge of the guide track. A certain accumulation results at this point. Therefore, the space left between the end of the baffle means and the outer edge of the guide track is only such that only a single nut can pass around the baffle means. If a second nut arrives at the same time, this nut falls back onto the bottom of the spiral conveyor.

After passing round the first baffle means, the nut follows the path back to the wall of the conveyor, as a result of the ccentrifugal force. On doing this, the nut reaches the second baffle means. This does not lie against the guide track, or does not lie entirely thereagainst, but allows an intermediate space which however is only of such a size that a thin part of the nut can fit thereinto. The thick part of the nut cannot slide through but must pass around the second baffle means. This however provides that it is always the thick part of the nut which first reaches the transport means, irrespective of whether the nut meets the second baffle means with its thin part or its thick part. Conveyance between the two baffle means and the necessary turning of the nuts are enhanced by air issuing from at least one air nozzle.

This operation of aligning the nuts with the thick part leading has inter alia the substantial advantage that the thick part also reaches the milling discs first. Experience has shown that a better milling effect is initially achieved on the nuts, while, inter alia as a result of the speed at which the nuts are passed through the milling means, the milling action declines at the thin part of the nut, because of retarding moments of the milling discs which are pressed away from each other.

The nut also passes into the splitting means with its thick part leading. When this part is broken open, the thin part is also opened without difficulty. In the opposite case however, the thin part usually breaks off and the thick part is only incompletely opened because of the poorer quality milled groove.

Subsequent to the second baffle means, the guide track goes into a guide channel which is preferably of u-shaped to v-shaped cross-section, so that the nuts are scarcely capable of changing position at that time.

The conveyor belts or the upper run and the lower run are adapted to the nuts or the different thicknesses thereof. A necessary condition in this respect is for the conveyor belts to comprise flexible material.

As soon as the nut is laid on the lower run, the upper run is laid thereon from above. Thereafter the upper run and the lower run pass into a region in which there are oppositely disposed rollers which roll against the edge regions of the upper run and the lower run. As the end surfaces of the rollers are at a spacing from each other, which is less than the thickness of the nuts, the upper run and the lower run are partially adapted to the outside contours of the nuts. In order to take into account the variations in the thicknesses of the nuts, the rollers are mounted so as to be variable in a vertical direction. If only the edge regions of the upper run and the lower run are rolled by the rollers, four oppositely disposed rollers are required in each rolling unit.

According to the invention however, it is also provided that the upper run and the lower run are in the form of belts which are of a block-like cross-section, of a given thickness, wherein channels for receiving the nuts are formed in the facing surfaces of the belts.

In this embodiment, it is sufficient for two oppositely disposed rollers to press the upper run and the lower run together over their entire surfaces.

For reasons of better adhesion, the above-mentioned belts preferably comprise textile belts provided with a rubber coating.

This construction permits the nuts to be substantially clamped fast.

A further essential advantage of the process according to the invention is that the milling discs provide the nuts or the shells thereof with at least one groove which is of uniform depth but whose depth is less than or equal to the thickness of the shell of the nut. It is only by virtue of this arrangement that damage to the kernel of the nut is avoided in the milling operation.

The depth of the groove is restricted by the milling discs having on their annular surfaces a toothed ring and an annular shoulder which is arranged in a position of being displaced relative thereto, radially with respect to the axis of rotation. When the nuts are passed between the two milling discs, the annular shoulders substantially follow the form of the shell of the nut, while the milling discs are pressed away from each other against the return force of an energy storage means. According to the invention, the two milling discs overlap each other in the rest condition, that is to say, the distance between the two axes of rotation of the milling discs is less than the sum of their two radii. This has the advantage that not just the side surfaces of the shell of the nut but also the end and stalk surfaces are provided with at least one groove. The overlapping arrangement obviously means that the grooves are milled into the shell of the nut in a vertically staggered relative arrangement.

The essential advantage of this milling means lies in its simplicity of design, the possibility of using it in an automated process, in particular in a continuous process, and the high capacity for adaptation thereof to different configurations of nut shells, with damage to the kernels of nuts occurring extremely rarely.

The groove which extends almost entirely around the nut provides a desired breakage location at which the shell of the nut is now to be opened in a further step of the process. For this purpose, in accordance with the invention, knife blades are inserted into the grooves or the nuts are passed with the grooves over the knife blades. For the sake of simplicity, the cutting edge of the knife blade is initially sharp, to facilitate introducing it into the groove.

The cutting edge of blade increases in thickness in the direction of conveyance beyond the size of the width of the groove so that the shell of the nut is burst open.

The splitting means of such a design is preferably arranged directly adjacent the milling means in the space between the two conveyor belts, giving rise to the advantage that the nut is inserted into the splitting means while the grooves are still being milled in the nut.

The concept according to the invention however also includes spatial separation of the milling means and the splitting means.

In an apparatus for carrying out the process according to the invention, the transport means are preferably provided with means for separating and aligning the nuts and, downstream thereof, milling discs which are arranged at a spacing from each other in a vertically displaced arrangement relative to each other engage into the space between two conveyor belts, wherein the axes of rotation of the milling discs have a spacing which is less than the radius of the one milling disc plus the radius of the other milling disc, wherein, to restrict the depth of milling, the milling discs have at least one annular shoulder which is arranged at a position displaced with respect to a toothed ring, radially with respect to the axis of rotation, by an amount which is less than the thickness of the shell of the nut.

According to the invention, a plurality of processing apparatuses is to be set up one beside the other in a working hall, being connected by way of a shaker conveyor, in particular a shaker conveyor channel, conveyor belt or other transport means, on to which the nuts are placed from a storage space or a cleaning apparatus.

For each processing apparatus, the shaker conveyor has an aperture and a vibration container which is connected thereto and into which the nuts fall, being deflected by baffle means. When the first vibration container is full, the next nuts slide on the shaker conveyor beyond the first container to the next container, which they then fill. This arrangement ensures that all the processing apparatuses in this arrangement are charged with nuts.

The vibration container tapers towards a vibration channel, while a transfer opening of the vibration container is of such a configuration that only one nut can ever pass therethrough. This means that the nuts only pass individually into the vibration channel which is preferably of a u-shaped to v-shaped cross-section, whereby the nuts are aligned with their longitudinal axis substantially parallel to the direction of conveyance.

Another possible form of apparatus provides that, from the shaker conveyor, the nuts pass through a hopper or funnel into a spiral conveyor. The spiral conveyor vibrates with a circular configuration, whereby the nuts are transported on the guide tracks disposed in the conveyor, along the wall of the conveyor, as far as two baffle means, and are separated from each other and aligned in the manner described hereinbefore.

Following the baffle means, the guide track forms a guide channel of u-shaped to v-shaped cross-section, from which the nuts pass directly into the vibration channel. The vibration channel terminates above the lower run of the two conveyor belts, onto which the nuts are pushed.

The upper run is thereafter applied to the nuts and the nuts are clamped between the two conveyor belts, and passed to the milling means.

In order better to hold the nuts in the region of the milling means and the splitting means, rollers press the edge regions of the conveyor belts towards each other, but obviously only to such an extent that a space is left therebetween for the milling discs or the splitting means to engage thereinto. This action of pressing the edge regions of the conveyor belts results in the nuts being relatively well fixed in position between the two conveyor belts.

However, in accordance with the invention, there are also provided conveyor belts which are of a certain thickness, with rollers rolling over the entire width thereof. The conveyor belts have channels in the facing surfaces of the belts, for fixing the nuts in position.

Because of the variations in the thickness of the nuts, the rollers are variable in height, preferably being mounted by way of spring u-clips on bars which are connected to transverse members by way of energy storage means.

While this arrangement takes into account the variations in thickness of the individual nuts, adjusting screws disposed on the transverse member provide for adjustment of the average nut thickness of a calibrated kind of nut.

The bar and the transverse member of the rollers which roll on the edge regions of the upper run can preferably be bent by way of a hinge means, thereby permitting the nuts to be inserted better between the upper run and the lower run; however, they can also be of a fixed or stable bent configuration.

The milling means itself comprises two milling discs which are mounted on pivotal arms about an axis of rotation, the milling discs overlapping each other at a spacing. The pivotal arms are mounted on a drive means rotatably about pivots which preferably include energy storage means which hold the axes of rotation of the milling discs at a spacing relative to each other. The energy storage means may also comprise simple springs which press against the pivotal arms.

Arranged between the pivot of the pivotal arm and the drive means is a drive pinion or a V-belt pulley which is connected by way of a drive belt to a pinion which is disposed in a position between the free end of the pivotal arm and the milling disc and which drives the milling discs by way of the interposed pinion.

According to the invention, the two milling discs may also be arranged movably perpendicularly with respect to the direction of conveying movement. In that case the axes of rotation of the two milling discs are preferably mounted on a plunger member which opens into an energy storage means. The plunger member is moved perpendicularly to the direction of conveyance by a simple coil spring, a hydraulic means or the like. The milling discs are driven for example by way of a V-belt which is connected to a motor drive means and which can adapt itself to the perpendicular movement of the axes of rotation of the milling discs.

However, drive means acting by way of angle joints or the like are also conceivable.

The milling means is followed by the splitting or breaking means. Advantageously, the splitting or breaking means is mounted on the same conveyor belt section; however, it is in accordance with the present invention to provide a separate arrangement in respect of the splitting means, which is then connected to the milling means by way of further conveyor means.

In practice it has been found particularly desirable for the splitting means to be arranged so close to the milling means that the milling means can still operate unimpededly, but direct transfer from the milling discs into the splitting means is possible. This is the case particularly when the milling discs are still operating on the nut while the splitting means is beginning its operation of splitting the nut shell or the splitting means starts to operate. This avoids any possibility of a change in the position of the nut, which makes it difficult for the nut to be fed into the splitting means by way of the grooves.

The splitting means comprises two knives with knife blades, which are disposed with their cutting edges at a given spacing opposite to each other and which engage into the space formed between the two conveyor belts; the two knives are arranged at the same spacing as the milling discs and in a vertically offset relative arrangement.

By virtue of this arrangement, it is possible for the nuts to be taken over in the grooves produced by the milling discs.

The knife blade or the cutting edge tapers in thickness towards the milling discs. This means that the grooves can be better set into position on the relatively sharp cutting edge. The increase in the thickness of the knife blade causes the nuts to be burst open, in conjunction with a reduction in the spacing between the two cutting blades in the direction of conveyance of the nuts, against the pressure of a compression spring, by an adjustable deflection movement, the grooves serving as desired breakage locations.

The above-mentioned adjustable deflection movement takes account in particular of the different widths of nut in a precalibrated kind of nut. The basic adjustment to the width of a kind of nut is effected by way of adjusting screws which move, in a direction transverse with respect to the direction of conveyance, an entire base member on which a knife is mounted by way of a rotary member.

The rotary member on which the knife is interchangeably fixed and the base member are connected together by way of a guide pin about which the rotary member is rotatable with the above-mentioned deflection movement. An important point in regard to this splitting means is careful adjustment of the spacing between the two cutting edges. This spacing should not be too small as otherwise there is the danger of damage to the kernel of the nut. However, the spacing should also not be too large as otherwise the knives are only partly or not at all inserted into the groove and no splitting action is produced. The construction of the splitting means, which is simple to operate, substantially takes account of this problem, by virtue of the adjustable deflection movement.

In practice, it has been found that the possibility of a nut jamming in the splitting means due to being pushed by the following nut is eliminated.

The entire apparatus according to the invention operates extremely efficiently and without friction, at the lowest possible cost. The proportion of undamaged nut kernels is very high and high returns can accordingly be achieved. The number of personnel required is low and the operating personnel can be quickly trained on the machine.

BRIEF DESCRIPTION OF THE DRAWINGS

Further advantages, features and details of the invention are apparent from the following description of preferred embodiments, with reference to the drawing in which:

FIG. 4 shows a view similar to FIG. 3 of a further embodiment,

FIG. 6 shows a view similar to FIG. 5 of a further embodiment.

DETAILED DESCRIPTION

Figure 1:
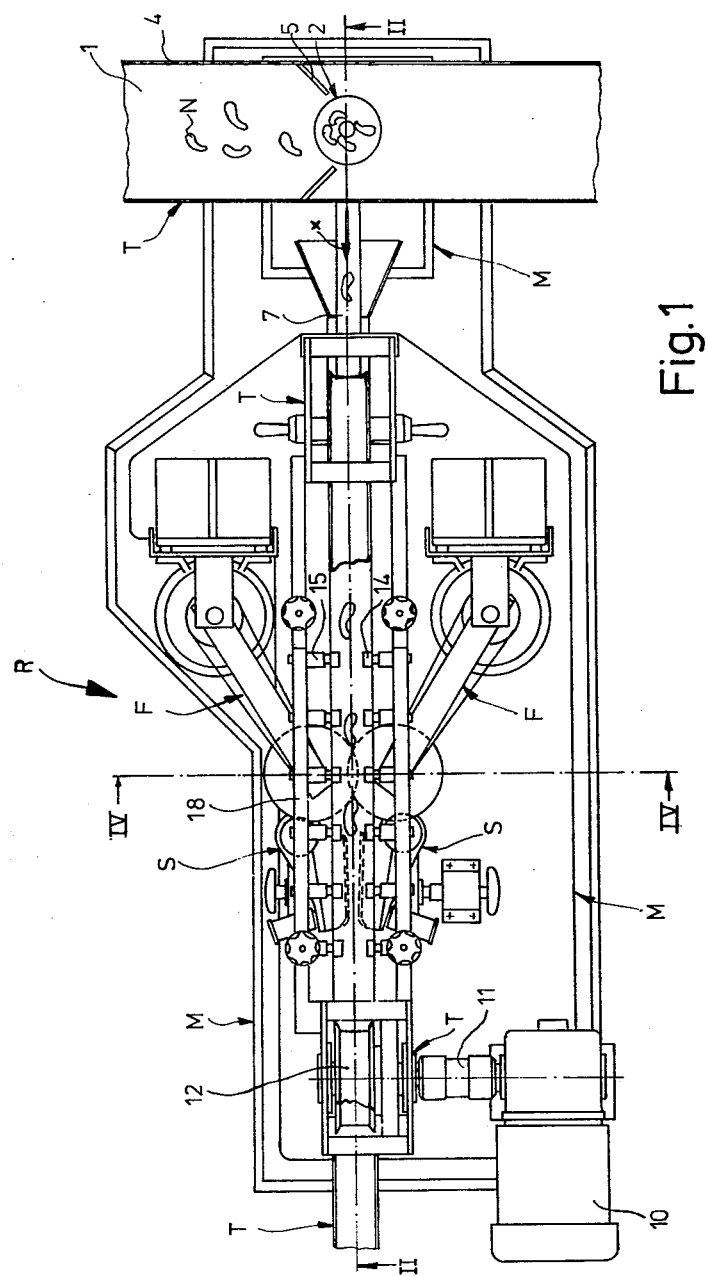
FIG. 1 shows a plan view of an apparatus for processing nuts.

An apparatus R for processing nuts N, in particular cashew nuts or the like, essentially comprises, as shown in FIG. 1, a transport unit T which is disposed on base members M, a milling means F and a splitting means S.

Figure 2:
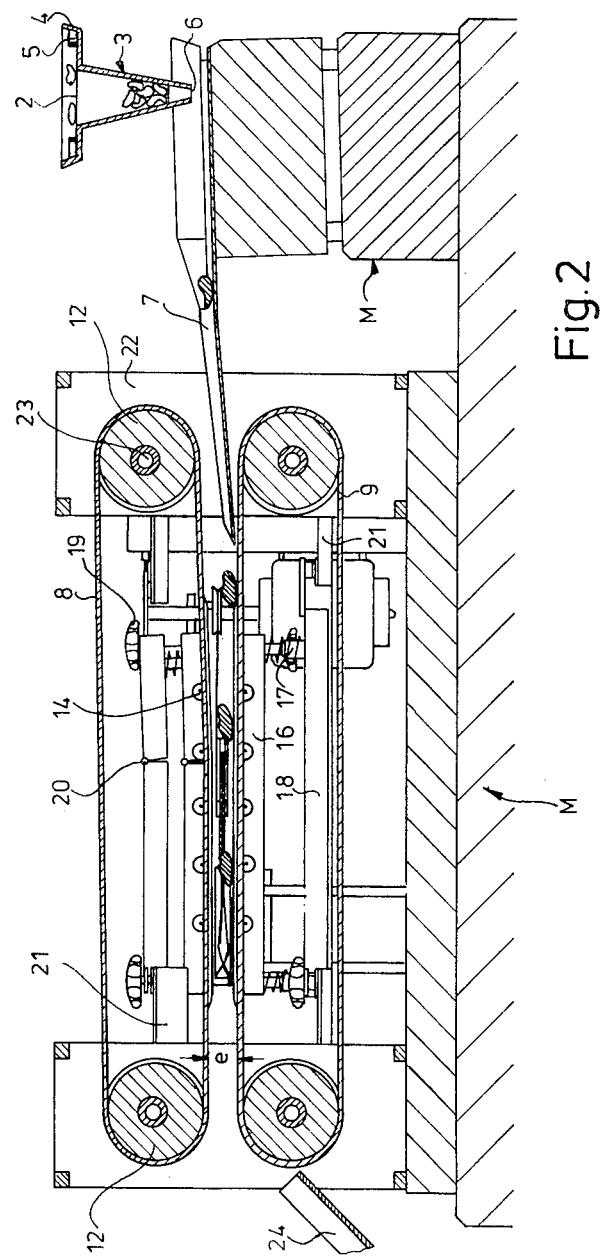
FIG. 2 shows a view in longitudinal section taken along line II—II in FIG. 1.

From a known cleaning apparatus (not shown) or storage space, the nuts N are passed by way of an elevator (also not shown) onto a vibrator conveyor 1 which communicates with vibrating containers 3 by way of openings 2 (see FIG. 2). Baffle members 5 point from the edge 4 of the conveyor track 1 towards the opening 2, to deflect the nuts N into the container 3.

The container 3 tapers away from the opening 2 towards a transfer opening 6 which permits only one nut to pass therethrough from the container 3.

From the transfer opening 6, the nuts fall individually into a vibration channel 7 which is of a u-shaped or v-shaped cross-section; the vibratory movement and the shape of the channel 7 cause the longitudinal axis of the nuts N to be aligned substantially parallel to the direction of conveyance X.

The vibration channel 7 opens into an endless conveyor means comprising an upper run 8 and a lower run 9, with the nuts being passed onto the lower run 9.

The speed of transportation movement of the nuts N is controllable by varying the strength of vibration of the vibration channel 7. The speed of movement of the runs 8 and 9 is determined by a drive 10 which drives the guide rollers 12 by way of a shaft 11 and possibly by way of further transmission members.

Increasing the speed of movement of the runs 8 and 9 with respect to the speed of the conveyor movement of the vibration channel 7 or reducing the vibration of the channel with the same speed of movement of the runs causes the nuts to be separated from each other and results in a desired distance between two nuts.

After the nuts have been transferred onto the lower run 9, the spacing e between the lower run 9 and the upper run 8 is reduced. This spacing is shown on an enlarged scale in FIG. 2. This reduction in the spacing e is produced by respective groups of four oppositely disposed rollers 14 which roll against the respective edge regions of the respective runs 8 and 9 and which are connected by spring U-clips 15 or the like. The spring members 15 of rollers 14 which roll a respective edge region are interconnected by way of a bar 16, and each bar 16 is connected by way of energy storage means 17 to transverse members 18 which are vertically adjustable by way of adjusting screws 19. The transverse member 18 and the bar 16 of the rollers 14 which lie against the two edge regions of the upper run 8 are preferably bendable in themselves about a respective hinge means 20.

The adjusting screws 19 are disposed on connecting portions 21 which are secured to wall portions 22 of the machine, which carry the guide rollers 12 therebetween and which have the shafts 23 thereof passing therethrough.

The adjusting screws 19 are used to set the average spacing e between the upper run 8 and the lower run 9 in the region of the milling means F and the splitting means S. The bars 16 or the rollers 14 can be adapted to a respective thickness d (see FIG. 5) of the nut N by means of the energy storage means 17 and the spring members 15.

The pressure of the rollers 14 on the edge regions of the runs 8 and 9 causes the nuts to be substantially enclosed by the runs 8 and 9, so that the nuts are firmly held in position. For this reason the runs 8 and 9 shown in FIG. 5 preferably comprise a flexible material.

In this respect however, as shown in FIG. 6, it is also possible for the upper run 8a and the lower run 9a to be of a thickness k in cross-section and to comprise a rubber layer 71 which is preferably applied to a textile belt 70, with channels 73 being formed in the facing surfaces 72 of the rubber layers 71, for receiving the nuts N.

With conveyor belts of this construction, it is sufficient to provide a respective pair of oppositely disposed rollers 14a for pressing against the upper run 8 and the lower run 9 over the entire surface thereof.

Because the nuts N are fixedly guided by virtue of the action of the rollers 14 on the upper and lower runs of the conveyor belts, the milling means F and the splitting means S are also arranged in this region. Downstream of or in the splitting means S, the spacing e between the two runs increases again, and the nuts are released and passed to a discharge means 24.

Figure 3:
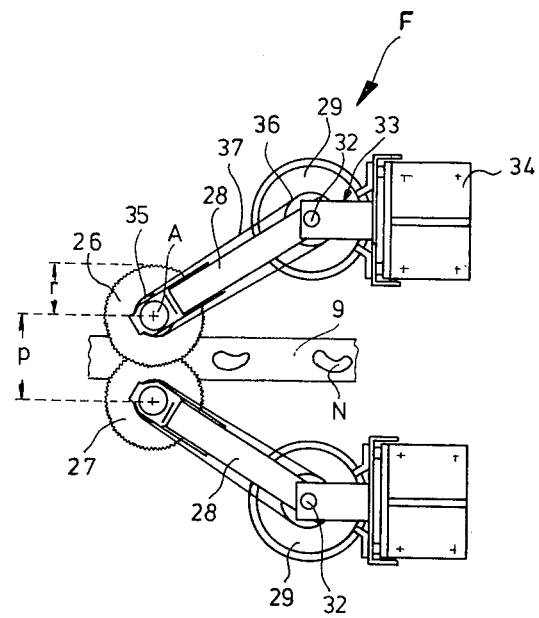
FIG. 3 shows a plan view of part of the apparatus of FIG. 1.
Figure 8:
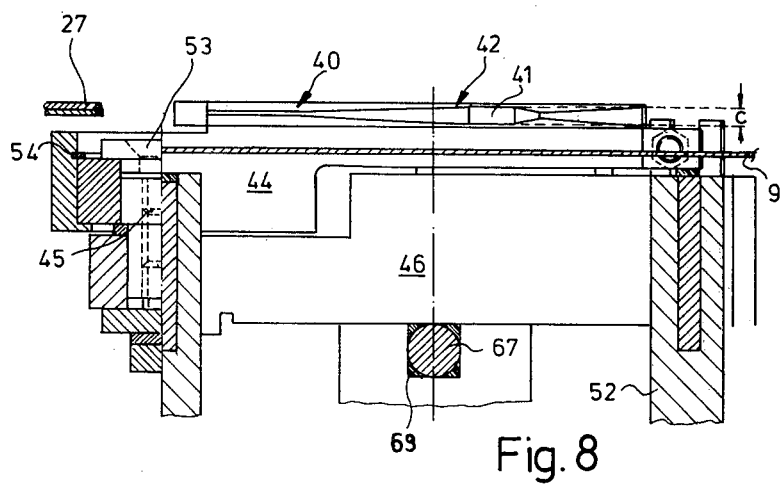
FIG. 8 shows a view in cross-section taken along line VI—VI in FIG. 7.

As shown in FIG. 3, the milling means F has two milling discs 26 and 27 which are connected to the free ends of pivotal arms 28 by their axes of rotation as indicated at A, with the interposition of a pinion 35. The pinion 35 is connected to a drive pinion 36 of a drive member 29 by way of a drive belt 37 or the like.

Figure 5:
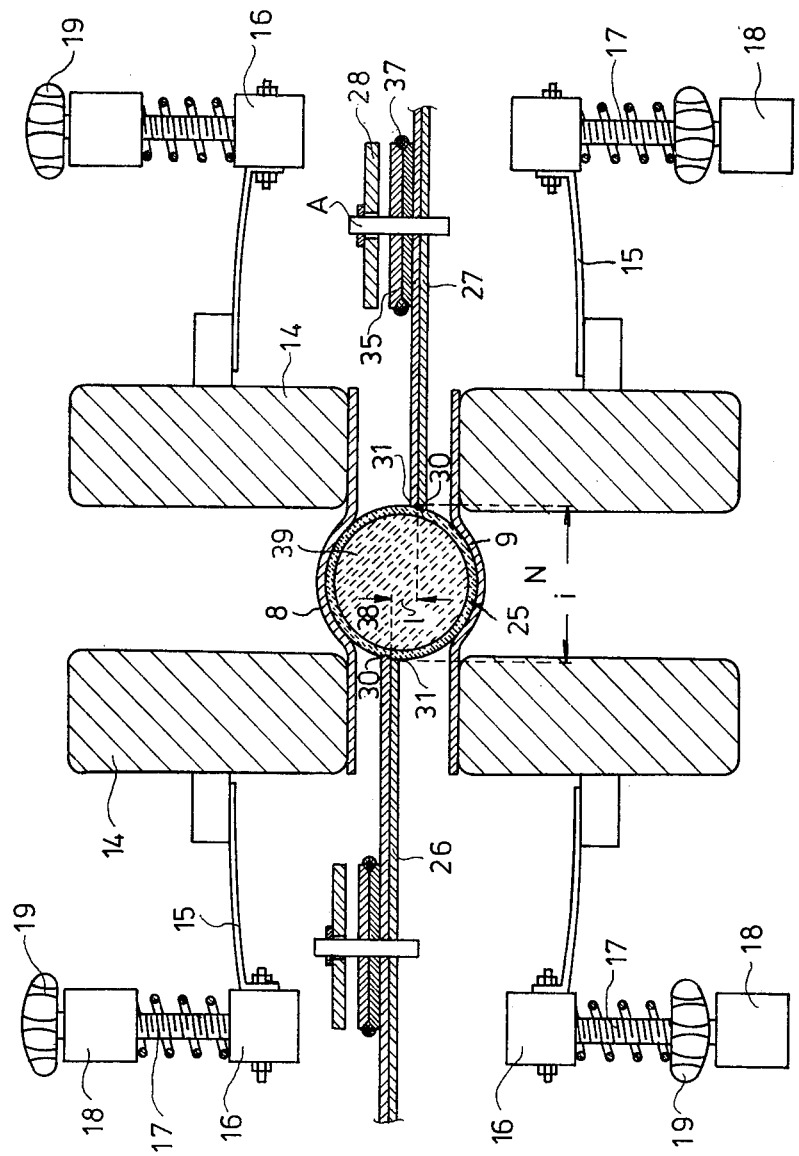
FIG. 5 shows a part of an enlarged cross-sectional view of the part of the apparatus shown in FIG. 3, in section taken along line IV—IV in FIG. 1, during a processing operation.

The milling discs 26 and 27 are arranged on both sides of the runs 8 and 9 in such a way that they engage into the space formed between the upper run 8 and the lower run 9 and indicated by the spacing e, while the two milling discs 26 and 27 are arranged in vertically displaced relative positions, with a spacing 1 therebetween, and thus overlap each other (FIG. 5). On their annular surface, the milling discs 26 and 27 carry a toothed ring 30 which is flanked on one or both sides by an annular shoulder abutment means 31 for restricting the depth of milling.

At the other end from the axis A of the milling discs 26 and 27, the pivotal arms 28 are mounted rotatably on pivots 32 (see FIG. 3); the pivots each contain respective energy storage means (not shown) which hold the axes of rotation A with the milling discs 26 and 27 mounted thereat at a spacing p from each other, the spacing p being less than double the radius r of the milling discs 26 and 27, thereby resulting in the overlapping relationship thereof.

If now the nut, held by the upper run 8 and the lower run 9, is moved to the milling means, one of its end surfaces firstly encounters one or both toothed rings 30. These mill a groove 38 into the shell 25 of the nut, but the annular shoulders 31 restrict the depth of milling so that the kernel 39 of the nut is not damaged.

When the nut is moved on, the annular shoulders 31 slide along the outside surface of the shell 25, and this results in an increase in the spacing p between the axes A of rotation, against the return force of the energy storage means in the pivot 32. The maximum spacing to be achieved between the two axes A of rotation of the milling discs corresponds to double the radius of the milling discs 26 and 27, as far as the annular shoulder 31, plus the width i of the nut. The width i is intended to indicate the position at which the nut N urges the milling discs 26 and 27 into their furthest apart position. On the other hand, the thickness d corresponds to the widest spacing e between the upper run 8 and the lower run 9, as produced by the nut. Under normal circumstances, the width i and the thickness d are not equal.

The energy storage means in the pivot 32 causes the spacing p between the axes of rotation of the milling discs to be adapted as far as possible to the surface contour of the shell 25 of the nut as the nut passes through the milling means, in which respect it is not just the side surfaces but also end surfaces or stalk surfaces of the nut which are provided with a groove 38 at the beginning and at the end of the operation, as the energy storage means in the pivot 32 returns the axes of rotation A to the original spacing p which is less than double the radius of the milling discs. The drive 29 and the pivot 32 are secured to a housing block member 34 by way of plate members 33, for stabilisation purposes.

However, as shown in FIG. 4, the two milling discs 26 and 27 may also be arranged in such a way as to be movable perpendicularly to the direction of conveying movement as indicated by x. In that case, the axes of rotation A of the milling discs are connected by way of plunger members 75 to an energy storage means 76 which maintains the spacing p in the rest position of the two milling discs.

The energy storage means 76 may comprise a simple coil spring, a hydraulic device or the like, and is fixed to wall portions 77 of the machine, or the like. In this embodiment also, the milling discs 26 and 27 are driven by means of the drive 29 and a V-belt 37a of rubber webbing type, which is adapted to the increase in the spacing p between the axes of rotation A when a nut N passes between the milling discs.

However, the drive may also be effected by way of angle joints (not shown).

Figure 7:
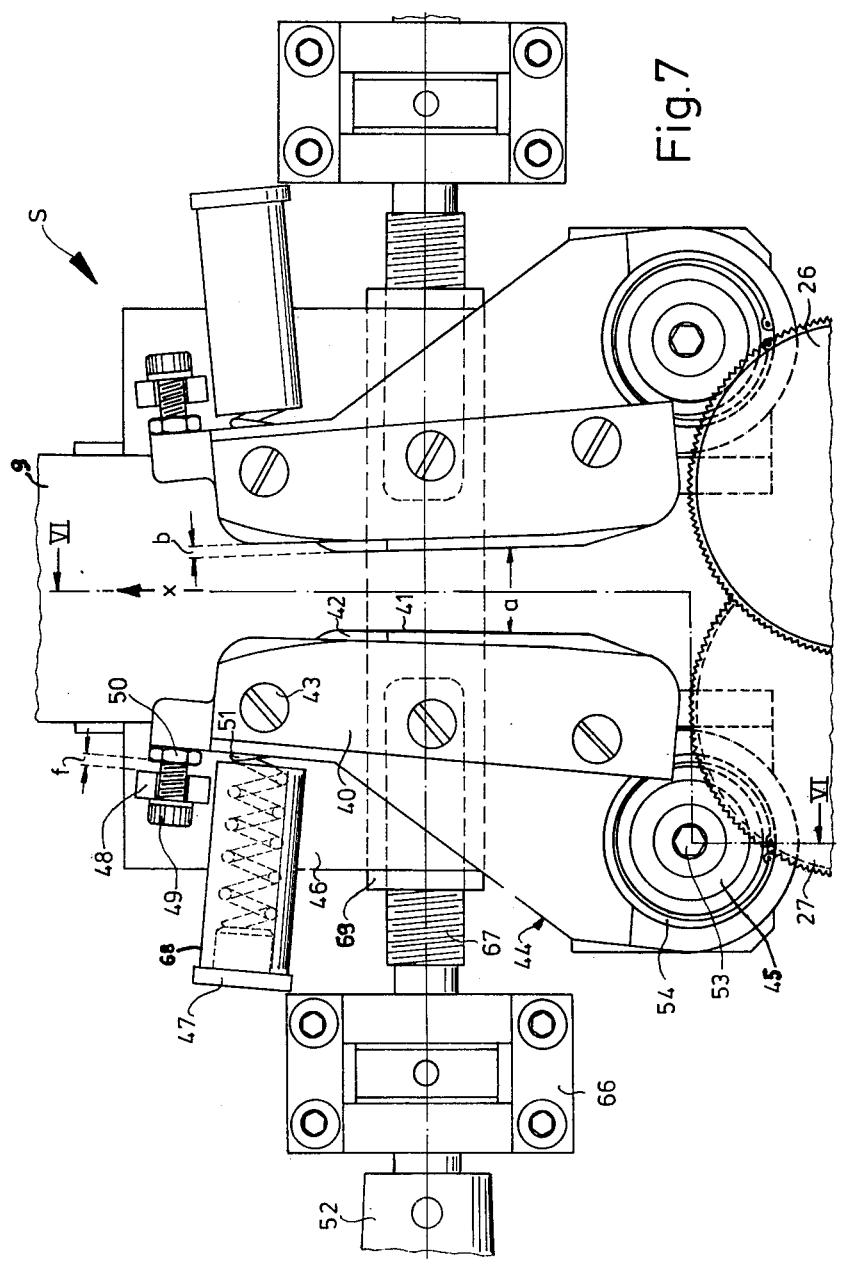
FIG. 7 shows a plan view of a further part of the apparatus of FIG. 1, on an enlarged scale.

From the milling means F, the nut N, clamped between the upper run 8 and the lower run 9, is transported to the splitting means S (see FIG. 7). The splitting means essentially comprises two knives 40 which are arranged in the space between the upper run 8 and the lower run 9 and which have knife blades 42 whose cutting edges 41 are disposed opposite each other at a spacing a which reduces in a taper configuration in the direction of conveying movement x.

The spacing a is always somewhat larger than the thickness g of the kernel 39 of the nut (see FIG. 5).

Preferably, the milling means F or the milling discs 26 and 27 and the splitting means S or the knives 40 are so close that the milling discs 26 and 27 can still rotate unimpededly about their respective axes A, but the nut is transferred directly from the milling disc to the knife, that is to say, the knife blades 42 are already sliding into the groove 38 when the milling discs 26 and 27 are still operating on the same nut. This arrangement substantially eliminates any tipping of the nut in the operation of conveying it from the milling means F to the splitting means S.

As, as a result of the overlapping relationship of the two milling discs 26 and 27, the grooves 38 in the nut are milled therein at vertically displaced positions at a spacing 1, the knives 40 are also in a vertically displaced arrangement relative to each other, with the same spacing 1 therebetween.

The knife blade 42 is of a width b which is less than the thickness of the shell 25 of the nut, and a thickness c which reduces in a tapered configuration towards the milling means F or the milling discs 26 and 27 (see FIG.

8). This arrangement facilitates initially engaging the cutting edge 41 into the groove 38. The subsequent increase in the thickness of the blade 42 causes the nut to be burst open.

The knives 40 are removably secured by means of countersunk screws 43 to a rotary member 44 which is mounted for rotary movement about a guide pin 45 with an inset screw 53 and clamping ring or collet 54, the rotary member 44 being rotatable over the range of a deflection movement f. The rotary member 44 is connected to a base member 46. The base member 46 rests on stilts 52.

The deflection movement of the member 44 is determined by an adjusting screw 49 which is mounted movably in a base portion 48, with a lock nut 53 disposed on the member 44.

The deflection movement f is maintained by a compression spring 51 which is incorporated into a tube portion 68 and which bears at one end against a closure screw 47 and at the other end against the member 44.

The spacing a between the two oppositely disposed blade edges 41 is set by way of two oppositely disposed long screws 67 with star handles 52, which are connected together by way of a connecting member 69 with an internal screw thread. The screws 67 are fixed at holders 66.

Figure 9:
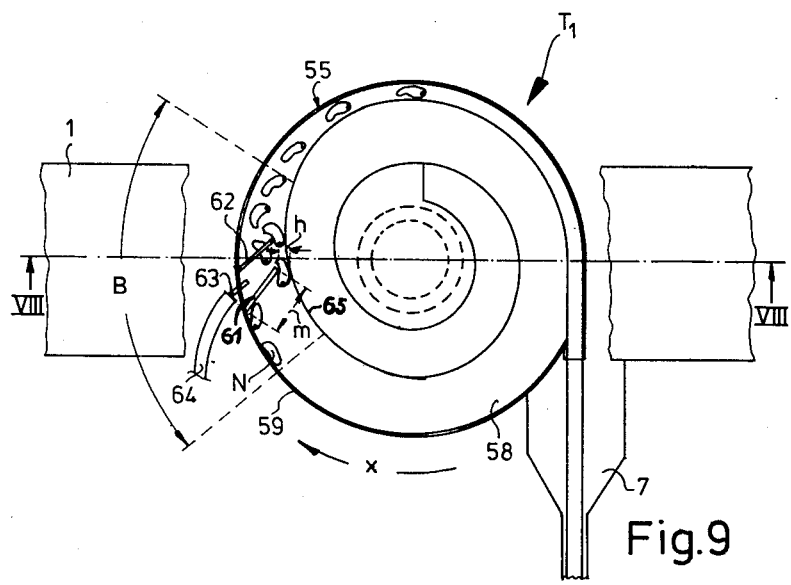
FIG. 9 shows a plan view of another embodiment of a part of an apparatus as shown in FIG. 1.

Referring now to FIG. 9, a further embodiment of a part T₁ of the transport means T has a spiral conveyor which is preferably driven electromagnetically. The nuts N are conveyed in the conveyor 55 by a vibratory movement.

The nuts are supplied on a vibratory conveyor track 1 and fall through a hopper or funnel 56 onto the bottom 57 of the conveyor 55, the bottom being arched upwardly in a conical configuration. The conveyor vibrates with a circular movement, whereby the nuts are advanced on a somewhat inclined guide track 58. In this arrangement, as a result of centrifugal force, the nuts have a tendency to slide along the wall 59 of the conveyor 55.

Figure 10:
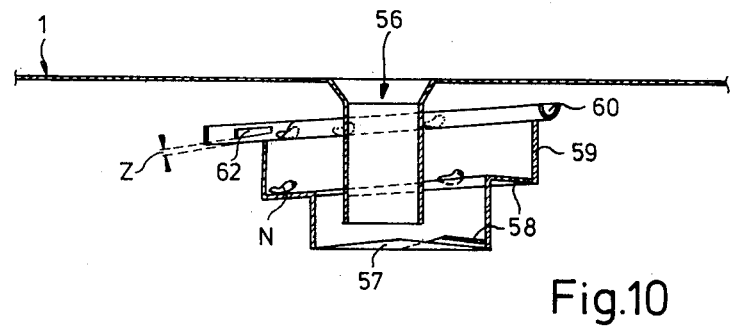
FIG. 10 shows a view of the part of the apparatus shown in FIG. 9 in section taken along line VIII—VIII.

In the first distance of something more than one and a half revolutions in the conveyor 55, the guide track 58 is of an outwardly inclined flat cross-section. This is followed by a region B for aligning the nuts. Following the region B, the nuts are advanced in a u-shaped channel 60 (see FIG. 10), in which the nuts can no longer undergo a change in position.

In region B, two baffle means 61 and 62 which are arranged one after the other project at an inclined angle with respect to the direction of conveying movement x from the wall 59. While the first baffle means 61 is fixed over its entire length m on the guide track 58, the second baffle means 62 has a section which tapers away from the wall 59 thereby forming a space z between the baffle means 62 and the guide track 58, which space extends in a tapered configuration towards the wall 59.

Provided between the two baffle means 61 and 62 is an air nozzle 63 which is connected by way of a connecting hose 64 or the like to a compressed air means (not shown).

The nut which is conveyed in a position against the wall 59 on the guide track 58 slides along the first baffle means 61 to the outer edge 65 of the guide track. The baffle means 61 does not extend over the entire width of the guide track 58 but leaves a gap h free between the baffle means 61 and the outer edge 65 of the guide track, the gap h being only a little more than the width b of a nut. This arrangement ensures that the nuts are separated from each other, although the baffle means 61 applies a braking and accumulation action to the nuts which must move away from the wall 59 against centrifugal force.

The nut now passes into the space between the first baffle means 61 and the second baffle means 62 where the speed of conveying movement is increased again, by means of the air from the air nozzle 63, while the centrifugal force means that the nut seeks to move back to the wall 59.

The space z between the baffle means 62 and the conveyor track 58 is so designed that only the thin end of the nut can slide into that space. The thick end of the nut must pass along the wall of the baffle means 62 which faces towards the baffle means 61, until it reaches the free end of the baffle means 62, or until the space z corresponds to the thickness d of the space z; in this operation, the supply of air from the air nozzle 63 has an accelerating effect.

This arrangement provides that almost all nuts pass with their thick end (stalk end) leading into the channel 60, after passing around the baffle means 62.

The vibration channel 7 adjoins the channel 60, and preferably engages at an inclined angle into the space formed between the upper run 8 and the lower run 9.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

I claim:

1. An apparatus for shelling nuts or the like comprising:
    transport means including means for separating and aligning said nuts;
    conveyor means downstream of said transport means for receiving the separated and aligned nuts, said conveyor means including a pair of spaced apart conveyor belts; and
    first and second milling discs disposed opposite each other in overlapping relationship and at substantially the same distance dowwnstream of said transport means within the space formed by said pair of conveyor belts, said first and second milling discs each being provided with a cutting ring on the circumference thereof, said first and second milling discs being vertically displaced with respect to each other within said sapce wherein the distance between the axes of rotation of said first and second milling discs is less than the sum of the radii of said first and second milling discs such that both of said first and second milling discs cut the shell of the nuts simultaneously, said first and second milling discs being provided with an annular shoulder displaced radially with respect to said cutting ring for controlling the depth of the cut wherein the depth of the cut is less than the thickness of the shell of said nuts.

2. An apparatus according to claim 1 wherein said transport means comprises a shaker conveyor, a vibrating container, and a vibrating channel, said vibrating container having an inlet opening for receiving said nuts from said shaker conveyor and an outlet designed for said nuts so as to individually dispose said nuts on said vibrating channel.

3. An apparatus according to claim 1 wherein said transport means comprises a shaker conveyor, a vibrating spiral conveyor and a vibrating channel, said vibrating spiral conveyor being provided with a circular guide track for receiving said nuts from said shaker conveyor and delivering said nuts to said vibrating channel.

4. An apparatus according to claim 3 wherein said vibrating spiral conveyor includes means for aligning said nuts.

5. An apparatus according to claim 4 wherein said means for aligning said nuts comprise a first baffle means and a second baffle means downstream of said first baffle means and air inlet means positioned between said first and second baffle means.

6. An apparatus according to claim 5 wherein said first and said second baffle means extend from one side wall of the guide track such that the free end of said first and said second baffle means is spaced from the second side wall of said guide track a distance which is substantially the width of said nuts.

7. An apparatus according to claim 6 wherein a space which is less than the maximum thickness of said nuts and which tapers toward said first side wall is formed between said guide track and said second baffle means.

8. An apparatus according to claim 1 further including splitting means downstream of said first and second milling discs for separating the shell from said nuts.

9. An apparatus according to claim 8 wherein roller means are provided for biasing said pair of spaced apart conveyor belts toward each other in the region of said milling discs and said splitting means.

10. An apparatus according to claim 9 wherein the position of said roller means is adjustable.

11. An apparatus according to claim 9 wherein said roller means are fixed to bar means by means of spring clips, said bar means being connected to a transverse member by way of an energy storage means.

12. An apparatus according to claim 11 wherein said transverse member, said bar means and said rollers are adjustable in height by means of an adjusting screw.

13. An apparatus according to claim 12 wherein said bar and said transverse member can be moved away from said pair of conveyor belts by hinge means.

14. An apparatus according to claim 1 wherein said pair of conveyor belts are of a thickness k and said nuts are received in said space between said conveyor belts.

15. An apparatus according to claim 1 wherein said distance between the axes of rotation of said first and second milling discs is variable.

16. An apparatus according to claim 15 wherein said first and second milling discs are mounted on pivotable arms, said pivotable arms being biased by energy storage means wherein said distance is variable against the biasing force of said energy storage means.

17. An apparatus according to claim 15 wherein said first and said second milling discs are mounted on means movable perpendicular with respect to the conveyance of said nuts, said means being biased by an energy storage means and said distance being variable against the biasing force of said energy storage means.

18. An apparatus according to claim 8 wherein said splitting means is positioned downstream of and proximate to said milling discs such that said splitting means and said milling discs operate on said nuts simultaneously.

19. An apparatus according to claim 8 wherein said splitting means comprises two knives having knife blades, said knives being disposed opposite each other within said space formed by said pair of conveyor belts, said knives being provided with cutting edges spaced apart at a distance a.

20. An apparatus according to claim 19 wherein means are provided for adjusting the distance a and said blades are pivoted rotatably about a guide pin.

21. An apparatus according to claim 20 wherein the spacing a is adjusted to the average width of the nut less the depth of the cut, while adjusting members define a deflection movement of the blades by the extent of which the spacing a is variable against the force of a biasing spring.

22. An apparatus according to claim 19 wherein the spacing a tapers in the direction of conveyance.

23. An apparatus according to claim 19 wherein the thickness of the knife blades tapers toward said milling discs.

24. An apparatus according to claim 23 wherein the knives are interchangeably positioned on a rotary member by means of screws.

* * * * *

UNITED STATES PATENT AND TRADEMARK OFFICE
CERTIFICATE OF CORRECTION

PATENT NO. : 4,321,865
DATED : March 30, 1982
INVENTOR(S) : Roland Ramseier

It is certified that error appears in the above-identified patent and that said Letters Patent are hereby corrected as shown below:

Column 12, claim 1, line 51, change "sapce" to --space--.

Column 13, claim 5, line 12, change "comprise" to --comprises--.

Column 14, claim 24, line 43, change "23" to --19--.

Signed and Sealed this

Thirteenth Day of July 1982

[SEAL]

Attest:

*Attesting Officer*

GERALD J. MOSSINGHOFF

*Commissioner of Patents and Trademarks*